US 8,405,657 B2
Mar. 26, 2013

(12) United States Patent
Breton et al.

(10) Patent No.: US 8,405,657 B2
(45) Date of Patent: Mar. 26, 2013

(54) ANIMATABLE GRAPHICS LIGHTING ANALYSIS

(75) Inventors: Pierre-Felix Breton, Chambly (CA); Kelcey Simpson, Austin, TX (US); Michael Zyracki, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 648 days.

(21) Appl. No.: 12/207,412

(22) Filed: Sep. 9, 2008

(65) Prior Publication Data

US 2010/0060639 A1 Mar. 11, 2010

(51) Int. Cl.
G06T 15/50 (2011.01)
G06T 15/00 (2011.01)

(52) U.S. Cl. .............................. 345/426; 345/419
(58) Field of Classification Search .......... 345/419, 345/426, 626, 629, 630, 634, 636, 641
See application file for complete search history.

(56) References Cited

U.S. PATENT DOCUMENTS

| | | | | |
|---|---|---|---|---|
| 4,868,552 A * | 9/1989 | Chang | ........................... | 345/641 |
| 5,307,295 A * | 4/1994 | Taylor et al. | ........................... | 703/1 |
| 5,386,505 A * | 1/1995 | Beattie et al. | ........................... | 715/790 |
| 5,414,801 A * | 5/1995 | Smith et al. | ........................... | 345/419 |
| 5,553,211 A * | 9/1996 | Uotani | ........................... | 345/641 |
| 5,689,284 A | 11/1997 | Herget | | |
| 5,801,714 A | 9/1998 | Holt | | |
| 5,821,944 A | 10/1998 | Watkins | | |
| 5,831,637 A | 11/1998 | Young et al. | | |
| 5,905,503 A * | 5/1999 | Penna | ........................... | 345/426 |
| 5,956,039 A * | 9/1999 | Woods et al. | ........................... | 345/419 |
| 5,966,131 A * | 10/1999 | Marks | ........................... | 345/418 |
| 6,016,150 A * | 1/2000 | Lengyel et al. | ........................... | 345/426 |
| 6,040,835 A * | 3/2000 | Gibson | ........................... | 345/424 |
| 6,169,553 B1 * | 1/2001 | Fuller et al. | ........................... | 345/427 |
| 6,466,210 B1 * | 10/2002 | Carlsen et al. | ........................... | 345/629 |
| 6,961,055 B2 * | 11/2005 | Doak et al. | ........................... | 345/419 |
| 6,985,148 B2 * | 1/2006 | Liang et al. | ........................... | 345/473 |
| 7,423,645 B2 | 9/2008 | Dougherty et al. | | |
| 7,620,912 B1 | 11/2009 | Benson et al. | | |
| 7,777,761 B2 * | 8/2010 | England et al. | ........................... | 345/619 |

(Continued)

OTHER PUBLICATIONS

Lumen Designer Help Document—from www.lighting-technologies.com, dated Apr. 29, 2004, 208 pages, retrieved from: http://replay.waybackmachine.org/20051221155839/http://216.122.58.200/Downloads/Designer/Docs/Lumen%20Designer%20Help%204-04.pdf.*

(Continued)

*Primary Examiner* — Daniel Hajnik
(74) *Attorney, Agent, or Firm* — Patterson & Sheridan LLP

(57) ABSTRACT

One embodiment of the invention sets forth a mechanism for displaying lighting values associated with a 3-D graphics model by superimposing an overlay grid with lighting values on the 3-D graphics model. A software rendering engine computes lighting values for each frame that includes the 3-D graphics model, where each frame may have different lighting settings. An overlay grid with lighting values may be superimposed on an area defined by a light meter on the 3-D graphics model. The lighting values on the overlay grid are associated with the light meter and may vary frame-over-frame. In another embodiment, a JPEG image with a superimposed overlay grid with per-pixel lighting values covering a 3-D graphics model is generated for each frame that includes the 3-D graphics model. These JPEG images may be displayed on the screen and stored to an external memory.

17 Claims, 12 Drawing Sheets

U.S. PATENT DOCUMENTS

| | | | |
|---|---|---|---|
| 2001/0005208 A1* | 6/2001 | Minami et al. ............. 345/474 |
| 2001/0049771 A1 | 12/2001 | Tischler et al. |
| 2002/0067355 A1* | 6/2002 | Randel .................... 345/426 |
| 2003/0030642 A1 | 2/2003 | Chen et al. |
| 2003/0179197 A1* | 9/2003 | Sloan et al. ............... 345/426 |
| 2004/0155884 A1 | 8/2004 | Baker et al. |
| 2004/0201715 A1 | 10/2004 | Ishimura et al. |
| 2004/0243531 A1* | 12/2004 | Dean ........................ 706/55 |
| 2005/0081161 A1* | 4/2005 | MacInnes et al. .......... 715/765 |
| 2005/0132305 A1 | 6/2005 | Guichard et al. |
| 2005/0285873 A1* | 12/2005 | Baker et al. ............... 345/582 |
| 2006/0036960 A1* | 2/2006 | Loui ......................... 715/764 |
| 2006/0066610 A1* | 3/2006 | Asano et al. .............. 345/419 |
| 2006/0158677 A1 | 7/2006 | Soroushi et al. |
| 2006/0181527 A1* | 8/2006 | England et al. ........... 345/419 |
| 2006/0209067 A1* | 9/2006 | Pellacini et al. .......... 345/426 |
| 2006/0282776 A1* | 12/2006 | Farmer et al. ............. 715/719 |
| 2007/0013709 A1* | 1/2007 | Charles et al. ............ 345/581 |
| 2007/0033632 A1* | 2/2007 | Baynger et al. ............ 725/135 |
| 2007/0046665 A1* | 3/2007 | Nakagawa et al. ........ 345/426 |
| 2007/0176926 A1* | 8/2007 | Garcia et al. .............. 345/426 |

OTHER PUBLICATIONS

Lumen Designer Tutorial—from www.lighting-technologies.com, dated Apr. 29, 2004, 68 pages, retrieved from internet archive: http://replay.waybackmachine.org/20061011224800/http://216.122.58.200/Downloads/Designer/Docs/Lumen%20Designer%20Tutorials%204-04.pdf.*

N. Cheng; E. Lee; "Depicting Daylight: Types of Multiple Image Display", Proceedings Association of Computer Aided Design in Architecture Conference, Oct. 11-14, 2001, University of Buffalo, Buffalo NY, 14 pages, retrieved from: http://darkwing.uoregon.edu/~design/nywc/pdf/replite.pdf.*

M. Gleicher, "Projective Registration with Difference Decomposition", Proceedings IEEE Conference on Computer Vision and Pattern Recognition, Jun. 17-19, 1997, pp. 331-337.*

Inanici, M.N., Navvab, M.: The Virtual Lighting Laboratory: Per-pixel Luminaire Data Analysis. Leukos 3(2), 89-104 (2006).*

Gregory J. Ward. 1994. The RADIANCE lighting simulation and rendering system. In Proceedings of the 21st annual conference on Computer graphics and interactive techniques (SIGGRAPH '94). ACM, New York, NY, USA, 459-472.*

Lighting Analysts, "What is AGi32?" (2007).

Integrated Environmental Solutions, Ltd., "Light & Daylighting" (2006).

Ecotect, "Lighting Design," available at http://ecotect.com/products/ecotect/features/lighting 2006.

Reinhart, Christoph F., "Tutorial on the Use of Dayism Simulations for Sustainable Design," Institute for Research Construction (Aug. 29, 2006).

"The RADIANCE 3.5 Synthetic Imaging System," Lawrence Berkeley Laboratory (2003).

Office Action, U.S. Appl. No. 12/207,356, dated Mar. 30, 2011.

* cited by examiner

ANIMATABLE GRAPHICS LIGHTING ANALYSIS

BACKGROUND OF THE INVENTION

1. Field of the Invention

The present invention relates generally to the field of computer graphics and, more specifically, to animatable graphics lighting analysis reporting.

2. Description of the Related Art

In graphics design, one parameter that affects the final rendered image is the lighting that illuminates different surfaces of the graphics objects within the image at potentially different intensities. Lighting values are typically computed using sophisticated mathematical formulas involving factors like the positions of different objects relative to the light source(s) as well as the intensity of those light sources. Further, with a dynamic light source, i.e. a light source that has varying intensity and position over time, like daylight, lighting values associated with the different surfaces will vary over time too. Users of graphics modeling and creation software need to be able to inspect lighting values across the different objects in graphics scenes when designing the scenes to understand the effects that static and/or dynamic light sources have on their designs.

In typical graphics modeling and creation software, lighting values are computed with respect to different points on an object surface as the three-dimensional (3-D) scene is generated. However, the end-user can only view these lighting values one point at a time, usually by moving the cursor over the graphics scene. The end-user is not able to see the aggregate of the lighting values that were computed across the 3-D scene. Some graphics applications allow multiple lighting values to be computed for multiple points within a surface. However, there is no effective way to pull up these values associated with those surfaces.

In addition, since lighting values are computed one frame at a time, there usually is no efficient way to see the varying lighting values frame-over-frame, as the lighting changes.

As the foregoing illustrates, what is needed in the art is an effective mechanism for displaying lighting values associated with the surface of an object in a graphics scene, especially in graphics scenes where the lighting changes over time.

SUMMARY OF THE INVENTION

One embodiment of the present invention sets for a method for displaying lighting values associated with a graphics model. The method includes the steps of generating a light meter on a surface associated with the graphics model, where the graphics model includes one or more graphics objects, and the light meter defines a set of points on the surface associated with the graphics model, generating a light meter object corresponding to the light meter, computing a lighting value for each point in the set of points based on at least one light source associated with the graphics model to generate a first set of computed lighting values, and storing the first set of computed lighting values in the light meter object.

One advantage of the disclosed method is that the computed lighting values may be superimposed with an overlay grid on the graphics model, allowing the end-user to easily view the lighting values associated with the graphics model. In addition, since the lighting values associated with the light meter may be computed for every frame that includes the graphics model, the effects of a varying light source on the graphics model can be easily observed by way of the overlay grid with computed lighting values rendered on top of the graphics model.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
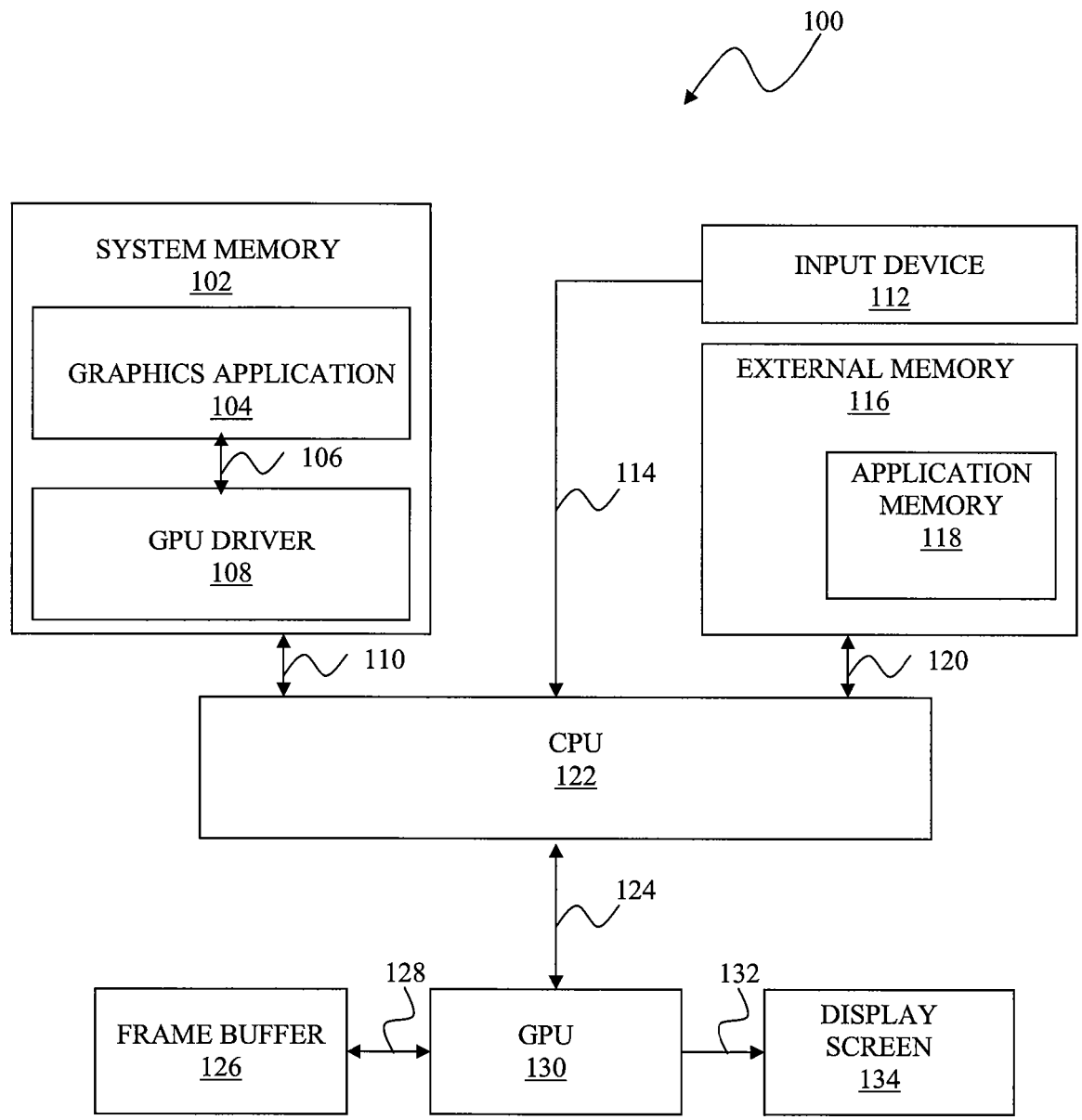
FIG. 1 illustrates a computer system configured to implement one or more aspects of the present invention.

FIG. 1 illustrates a computer system 100 configured to implement one or more aspects of the present invention. As shown, the computer system 100 includes a system memory 102, an input device 112, an external memory 116, a central processing unit (CPU) 122, a frame buffer 126, a graphics processing unit (GPU) 130 and a display screen 134. The system memory 102 includes a graphics application 104 and a GPU driver 108. The system memory 102 is a memory space, usually a random access memory, that temporarily stores software programs being used in the system 100 at any given time. The graphics application 104 and the GPU driver 108 are connected via a communication path 106. The graphics application 104 is a software program that allows an end-user to create and manipulate 3-D graphics models and view and store graphics data associated with the 3-D graphics models. The GPU driver 108 is a software program that allows the graphics application 104 to communicate with the GPU 130 via the CPU 122. The input device 112 is an end-user controlled input device, e.g. a mouse or keyboard that may manipulate various aspects of the graphics application 104. The external memory 116 is a storage device, e.g. a hard disk, and includes an application memory portion 118 for graphics data associated with the graphics application 104. The system memory 102, the input device 112 and the external memory 116 are connected to the CPU 122 via the communication paths 110, 114 and 120, respectively. The CPU 122 is configured to execute a sequence of stored instructions associated with and/or transmitted from the various elements in the computer system 100.

The graphics application 104 may transmit instructions to the CPU 122 via the communication path 110 to store graphics data to or retrieve graphics data from the application memory portion 118 within the external memory 116. The graphics application 104 may also transmit graphics data to the GPU driver 108. The GPU driver 108 processes the graphics data so that the graphics data can be understood by the GPU 130. The CPU 122 receives this processed graphics data from the GPU driver 108 via the communication path 110 and transmits the processed graphics data to the GPU 130 via communication path 124. The GPU 130 is configured to perform various tasks related to producing pixel data from the graphics data supplied by the CPU 122. Further, the GPU 130 is configured to store and update the produced pixel data in the frame buffer 126 via the communication path 128 and/or transmit the produced pixel data to the display screen 134 via the communication path 132 for display.

Figure 2:
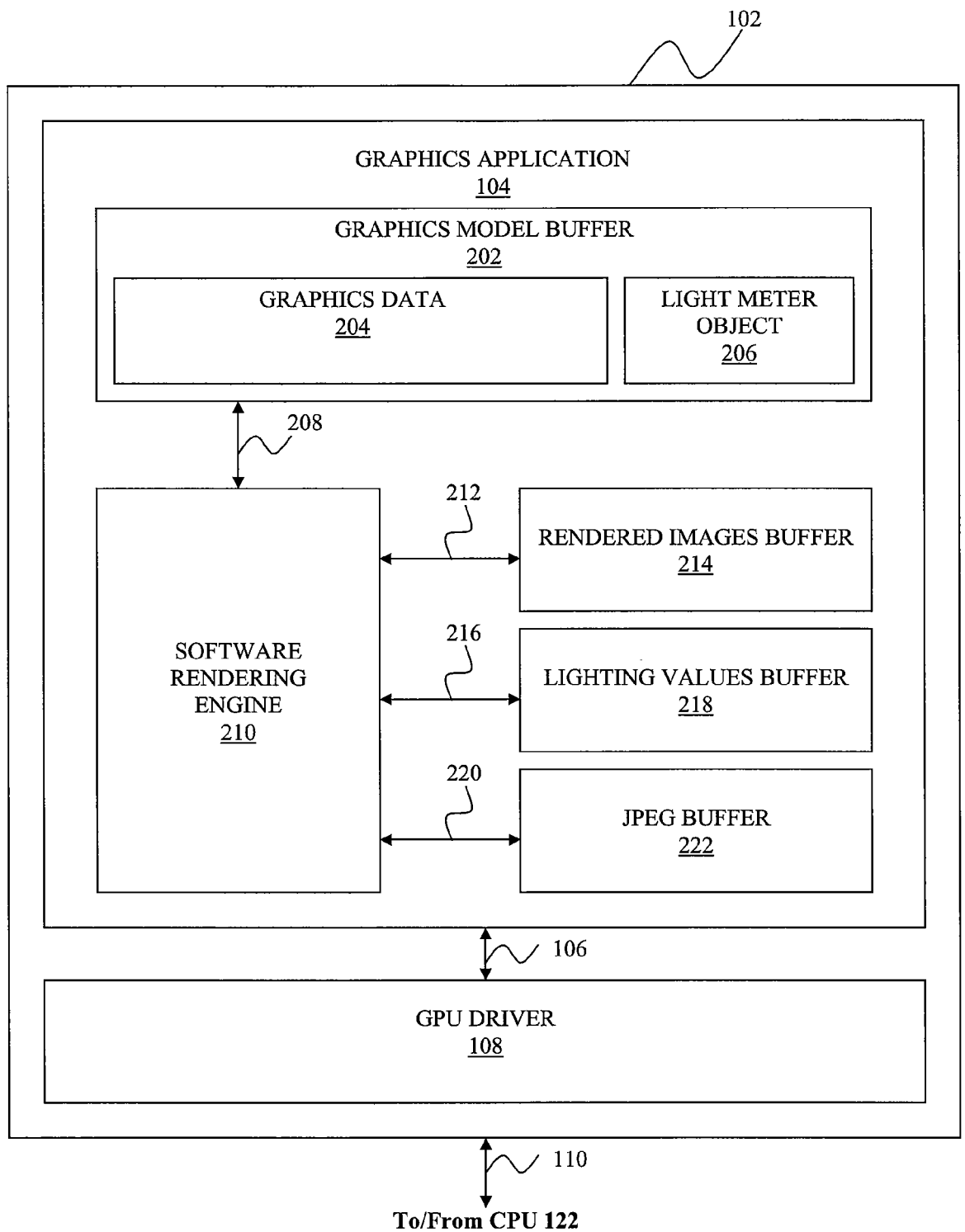
FIG. 2 illustrates a detailed view of the system memory of FIG. 1, according to one embodiment of the present invention.

FIG. 2 illustrates a detailed view of the system memory 102 of FIG. 1, according to one embodiment of the present invention. As shown, the system memory 102 includes the graphics application 104 and the GPU driver 108. The graphics application 104 includes a graphics model buffer 202, a software rendering engine 210, a rendered images buffer 214, a lighting values buffer 218 and a JPEG buffer 222. The graphics model buffer 202 includes graphics data 204 and a light meter object 206 and is connected to the software rendering engine 210 via a communication path 208. The graphics data 204 includes the graphics data associated with each frame of an user-defined 3-D graphics model. The light meter object 206 is a data structure that stores lighting data associated with a light meter defined on the 3-D graphics model. This lighting data may include lighting values and the color of the light meter for each rendered frame that includes the 3-D graphics model. In one embodiment, multiple light meter objects 206 may be stored in the graphics model buffer 202.

The software rendering engine 210 performs, among other things, various calculations on the graphics data 204 and computes lighting values associated with one or more light meters defined on the 3-D graphics model. In one embodiment, the lighting values reflect physically-based intensities, such as luminance or illuminance, associated with the 3-D graphics model. In alternative embodiments, the lighting values may relate to any other lighting characteristics associated with the 3-D graphics model. The lighting values are transmitted to the light meter object 206 in the graphics model buffer 202 via the communication path 208. The software rendering engine 210 is coupled to the rendered images buffer 214, the lighting values buffer 218 and the JPEG buffer 222 via the communication paths 212, 216 and 220, respectively. The software rendering engine 210 renders high-quality colored images of the 3-D graphics model using the graphics data 204 on a frame-by-frame basis. These high-quality colored images are transmitted to the rendered images buffer 214, via communication path 212, where the images are then stored.

In addition to computing light values associated with the various light meters, the software rendering engine 210 computes lighting values for every pixel of the 3-D graphics model on a frame-by-frame basis based on the graphics data 204. The computed per-pixel lighting values are then transmitted to the lighting values buffer 218, via communication path 216, where the per-pixel lighting values are stored. For each frame that includes the 3-D graphics model, the software rendering engine 210 superimposes an overlay grid with per-pixel lighting values retrieved from the lighting values buffer 218 on a corresponding rendered image retrieved from the rendered images buffer 214. The software rendering engine 210 converts the resulting image into a JPEG-formatted image. The JPEG images for different frames that include the 3-D graphics model are then transmitted to the JPEG buffer 222, via the communication path 220, where the JPEG images are stored. The JPEG images may also be transmitted by the graphics application memory 104 to the CPU 122, via the communication path 110, for storage in the application memory portion 118 of the external memory 116. In alternative embodiments, the software rendering engine 210 may convert the resulting image into any other technically feasible image format, such as TiFF or PNG.

Figure 3:
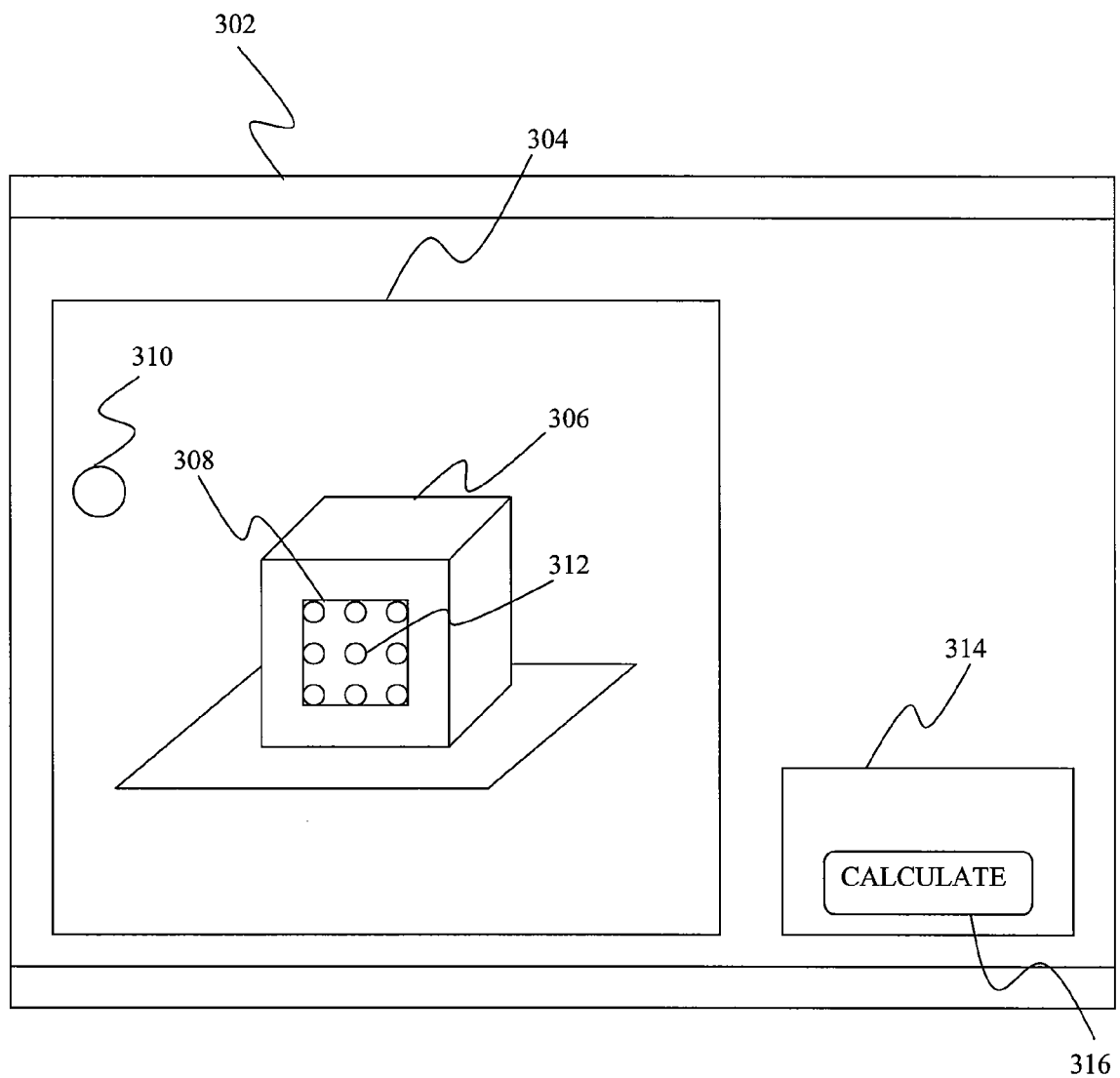
FIG. 3 illustrates an application display that includes a first display window 304, according to one embodiment of the present invention.

FIG. 3 illustrates an application display 302 that includes a first display window 304, according to one embodiment of the present invention. As shown, the application display 302 includes the first display window 304 and a graphical user interface 314. The first display window 304 displays the set-up for calculating lighting values for one or more surfaces of a 3-D graphics model 306. The 3-D graphics model 306 is a user-defined model that is created within the graphics application 104 and may be loaded from and saved to the external memory 116 by the graphics application 104. Along with the 3-D graphics model 306, the first display window 304 includes a light meter 308 and a light source 310. The light source 310 affects the lighting across the 3-D graphics model 306 and may be configured by the end-user such that the position of the light source 310 varies across each frame that includes the 3-D graphics model 306. As described in conjunction with FIG. 2, the graphics data associated with each frame that includes the 3-D graphics model 306 is stored in the graphics data 204 in the graphics model buffer 202.

The light meter 308 is a user-defined construct on a surface of the 3-D graphics model 306 that defines a set of grid points on the surface of the 3-D graphics model 306 for which lighting values are computed by the software rendering engine 210. A point 312 is one such grid point on the surface of the 3-D graphics model 306 for which the lighting value is computed. In one embodiment, the light meter 308 has a rectangular shape and the size of the light meter 308 and the density of grid points for which lighting values are computed may be modified based on user settings. The orientation of the light meter 308 is based on the normal of the model surface on which the light meter 308 is created. Multiple light meters 308 may be defined on different surfaces of the 3-D graphics model 306. The light meter 308 corresponds to the light meter object 206 of FIG. 2. As described in conjunction with FIG. 2, the light meter object 206 stores data associated with the light meter 308. This data includes the density of the grid points defined by the light meter 308 and the orientation and the size of the light meter 308.

The graphical user interface 314 includes a calculate button 316. When an end-user presses the calculate button 316, the software rendering engine 210 computes the lighting values associated with the light meter 308 for each frame that includes the 3-D graphics model 306. As described previously in conjunction with FIG. 2, the computed lighting values are stored in the light meter object 206. In addition, the software rendering engine 210 computes the per-pixel lighting values and creates a JPEG image that includes the 3-D graphics model 306 with a superimposed overlay grid with the per-pixel lighting values, for each frame, as previously described herein.

Figure 4A:
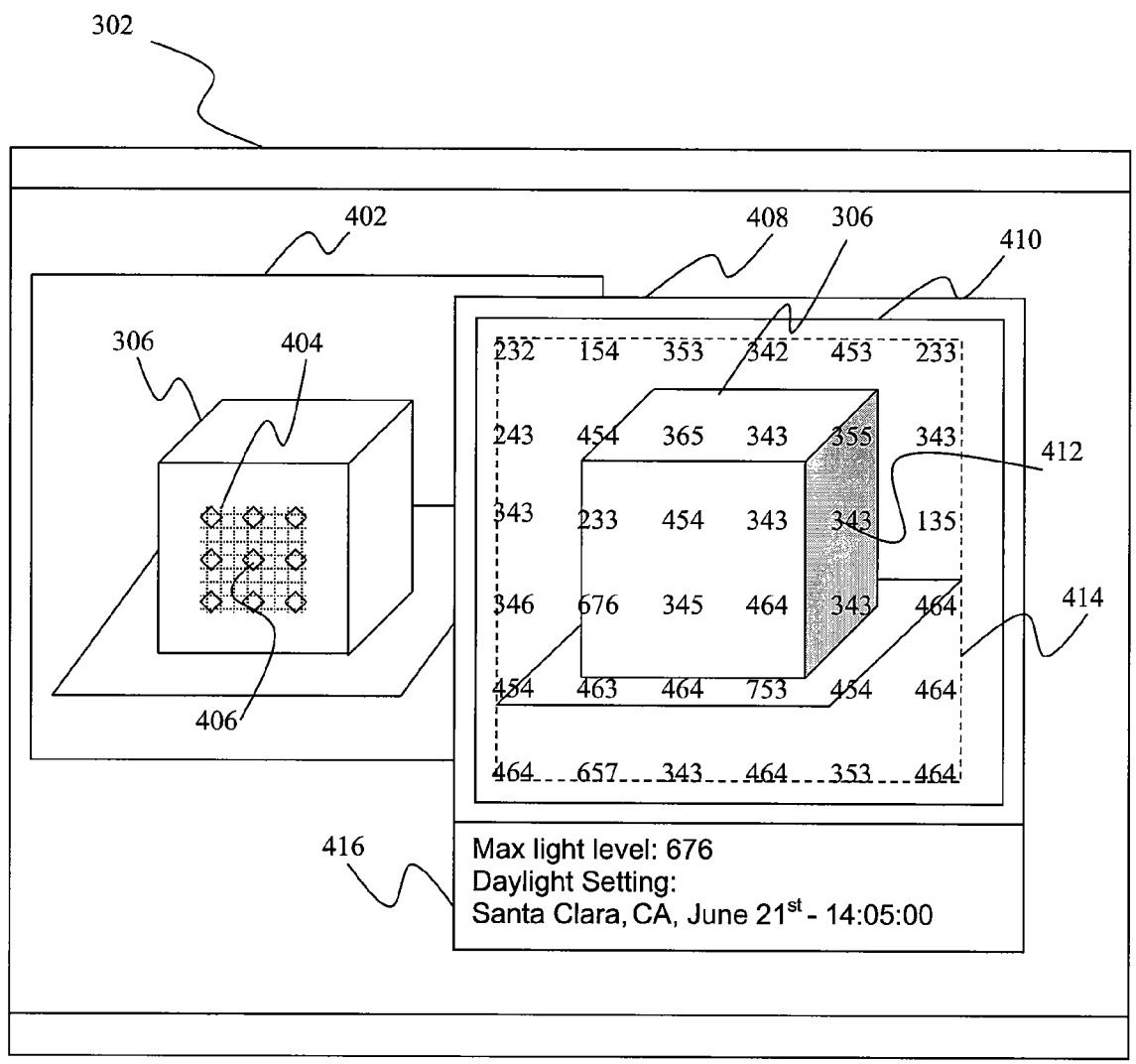
FIG. 4A illustrates a first display window that includes a first overlay grid superimposed on the 3-D graphics model of FIG. 3 as well as a second display window that includes a JPEG image of a second overlay grid superimposed on the 3-D graphics model, according to one embodiment of the present invention.

FIG. 4A illustrates a first display window 402 that includes a first overlay grid 404 superimposed on the 3-D graphics model 306 of FIG. 3 as well as a second display window 408 that includes a JPEG image 410 of a second overlay grid 414 superimposed on the 3-D graphics model 306, according to one embodiment of the present invention. As shown, the first display window 402 includes an image that includes the 3-D graphics model 306 and the first overlay grid 404. Each of the grid points on the first overlay grid 404 corresponds to a grid point defined by the light meter 308. The lighting values, like value 406, on each of the grid points in the first overlay grid 404 correspond to the computed lighting values stored in the light meter object 206.

For each frame that includes the 3-D graphics model 306, the graphics application 104 retrieves the associated lighting values corresponding to the grid points defined by the light meter 308 and information about the light meter 308, such as the position relative to one or more surfaces of the 3-D graphics model 306 and shading information, from the light meter object 206. The graphics application 104 then transmits these lighting values and light meter information to the GPU driver 108. The graphics application 104 also transmits instructions to render a superimposed first overlay grid 404 with lighting values on the 3-D graphics model 306 at a position defined by the location of the light meter 308 to the GPU driver 108. The GPU driver 108 transmits these instructions as well as the lighting values and light meter information to the GPU 130. The GPU 130 then renders a superimposed first overlay grid 404 with lighting values associated with the light meter 308 on the 3-D graphics model 306 and scans out the resulting image for display within the first display window 402.

Again, the lighting values displayed with the first overlay grid 404 correspond to the lighting values computed for the set of points on the surface of the 3-D graphics model 306 defined by the light meter 308 of FIG. 3. In some embodiments, the area covered by the first overlay grid 404 is shaded based on the intensity of the light, reflected in the lighting values. For example, if the lighting values reflect a high light intensity, then the area covered by the first overlay grid 404 may be shaded with a corresponding brightness. The 3-D graphics model 306 with the superimposed first overlay grid 404 and associated lighting values may be saved by an end-user in the external memory 116.

In addition, for each frame that includes the graphics model 306, the graphics application 104 transmits the corresponding JPEG image to the GPU driver 108 after retrieving the JPEG image from either the JPEG buffer 222 or the application memory portion 118 in the external memory 116. The graphics application 104 also transmits instructions to the GPU driver 108 to display the transmitted JPEG image in the second display window 408. In turn, the GPU driver 108 transmits the received instructions and JPEG image to the GPU 130, which renders and scans out the resulting JPEG image for display in a second display window 408. Again, the JPEG image includes the graphics model 306 along with the superimposed overlay grid with the per-pixel lighting values.

As also shown in FIG. 4A, the second display window 408 includes a JPEG image 410 and the statistical information 416. The JPEG image 410 includes a second overlay grid 414 with per-pixel lighting values, where each per-pixel lighting value is associated with one point on the grid, superimposed on the 3-D graphics model 306. In one embodiment, the second overlay grid 414 spans the entire area of the JPEG image 410 but, in other embodiments, the second overlay grid 414 may span only a portion of the area of the JPEG image 410. Each per-pixel lighting value, like value 412, is associated with a point on the second overlay grid 414 and may be color-coded based on hot/cold pseudo-coloring technique, to indicate the intensity of light at that point on the 3-D graphics model 306. The statistical information 416 includes information associated with the JPEG image 410, such as the maximum lighting value associated with the 3-D graphics model 306 and the modeled time of day reflected in the JPEG image 410. The statistical information 416 is generated by the graphics application 104 based on the lighting values computed by the software rendering engine 104 and/or the user-defined settings associated with the 3-D graphics model 306. The statistical information 416 is transmitted by the graphics application 104 to the GPU 130, via the GPU driver 108 and the GPU 130 renders the statistical information 416 along with the JPEG image 410 for display in the second display window 408.

Figure 4B:
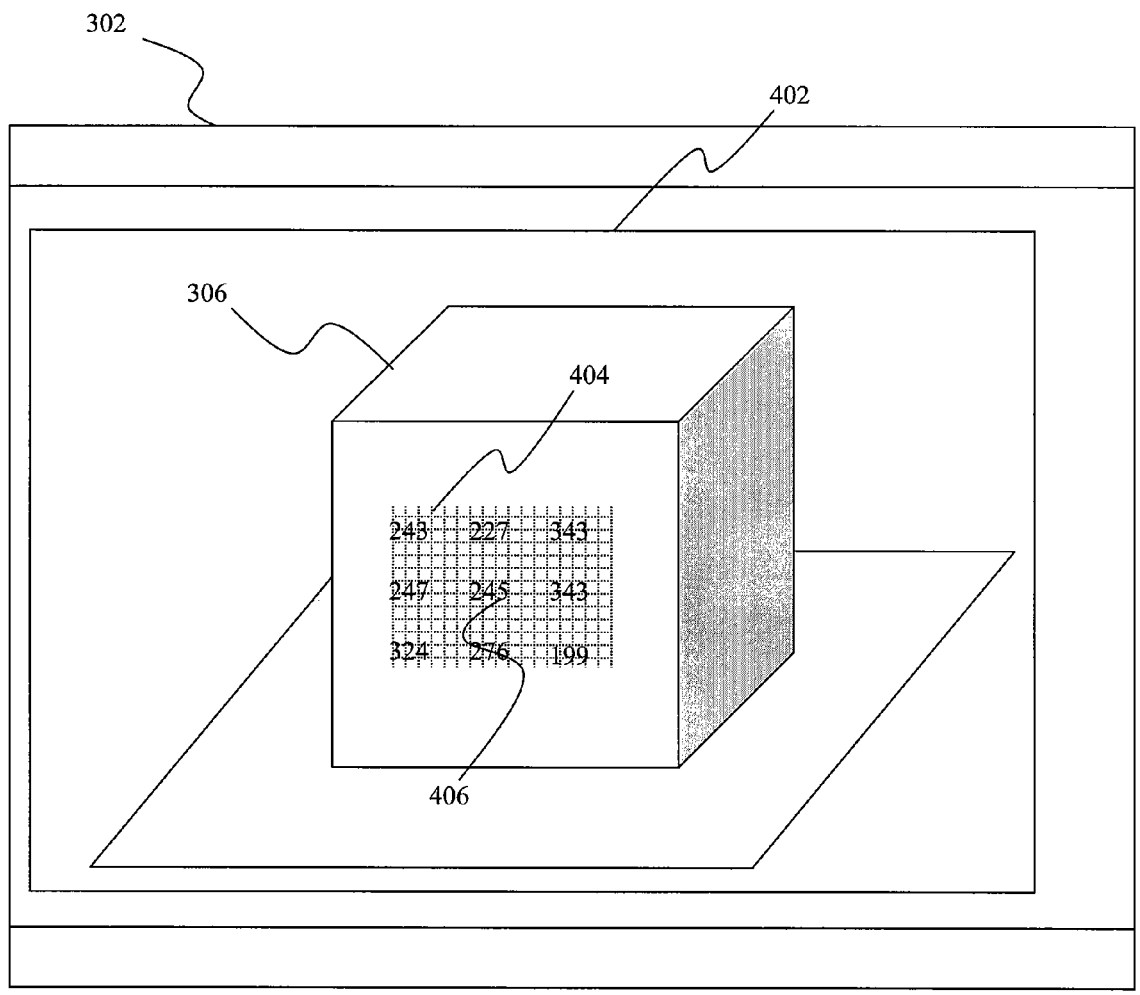
FIG. 4B illustrates a more detailed view of the first display window of FIG. 4A, according to one embodiment of the present invention.

FIG. 4B illustrates a more detailed view of the first display window 402 of FIG. 4A, according to one embodiment of the present invention. Again, the lighting values displayed with the first overlay grid 404, like the value 406, correspond to the lighting values computed for a set of points on the surface of the 3-D graphics model 306 defined by the light meter 308 of FIG. 3. Here, the displayed lighting value 406 has a numerical value of 245.

Figure 5A:
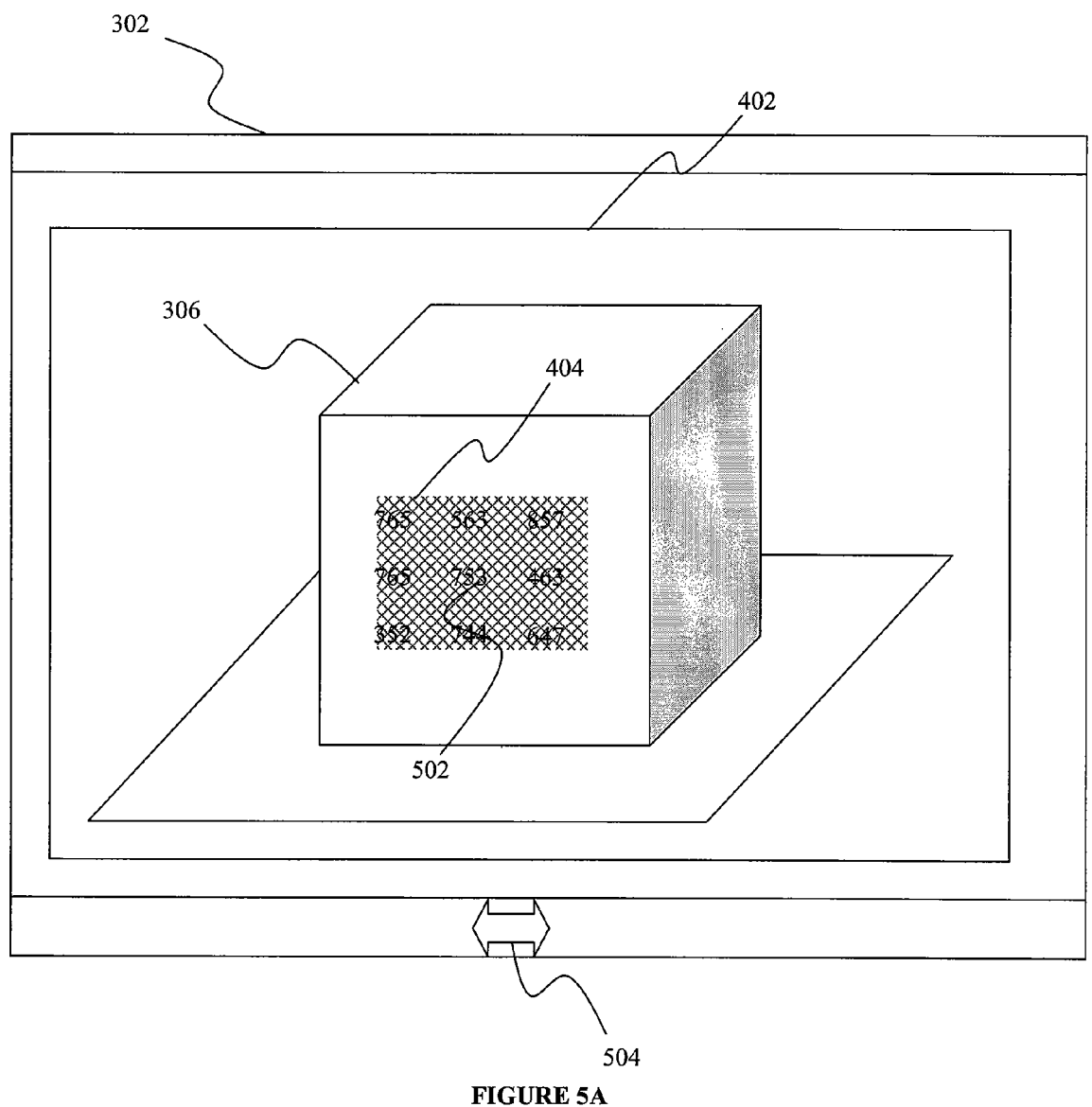
FIGS. 5A and 5B illustrate how the lighting values on the first overlay grid of FIG. 4A change frame-over-frame as a timeline scrollbar is moved, according to one embodiment of the present invention.
Figure 5B:
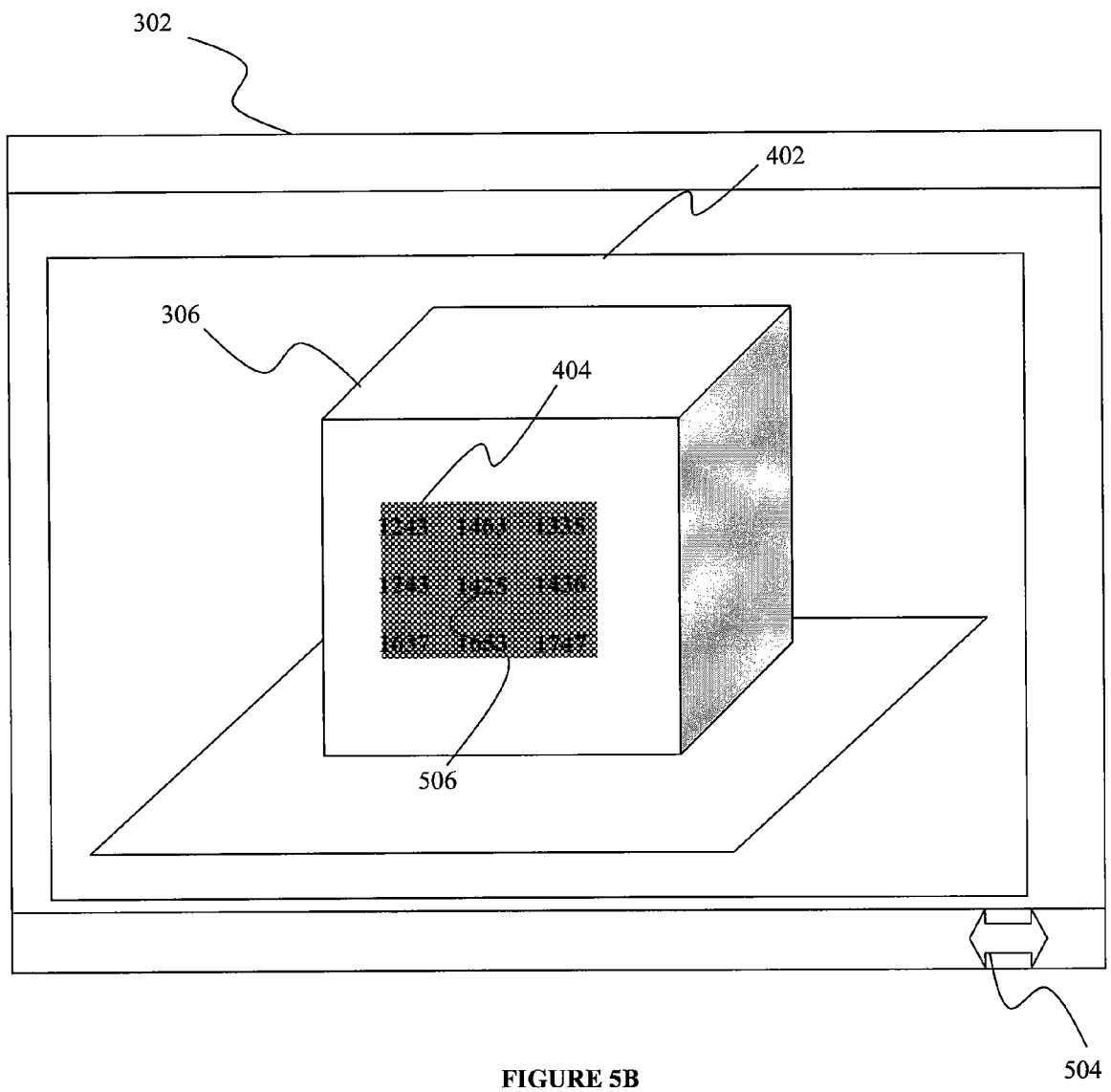

FIGS. 5A and 5B illustrate how the lighting values on the first overlay grid 404 of FIG. 4A change frame-over-frame as a timeline scrollbar 504 is moved, according to one embodiment of the present invention. As shown in FIGS. 5A and 5B, the application display window 302 includes a first display window 402 and a timeline scrollbar 504. The first display window 402 includes an image that includes 3-D graphics model 306 and a first overlay grid 404 which has lighting values associated with the light meter 308, superimposed on the 3-D graphics model 306. An end-user may move the timeline scrollbar 504 in the application display 302 left-to-right, using the input device 112. Each position of the timeline scrollbar 504 corresponds to a particular frame that includes the 3-D graphics model 306. As the timeline scrollbar 504 is moved, the graphics application 104 detects this movement and transmits the lighting values associated with a corresponding frame to the GPU driver 108. The graphics application 104 also transmits light meter information associated with the corresponding frame from the light meter object 206 to the GPU driver 108.

As described in conjunction with FIG. 4A, the lighting values and light meter information are transmitted by the GPU driver 108 to the GPU 130 and the GPU 130 renders an image that includes the 3-D graphics model 306 with a superimposed first overlay grid 404 with lighting values associated with the light meter 308. The GPU 130 scans out the resulting image for display in the first display window 402. Consequently, the first overlay grid 404 of FIG. 5A includes lighting values, like value 502, associated with a first frame corresponding to a first position of the timeline scrollbar 504. The first overlay grid 404 of FIG. 5B includes lighting values, like value 506, associated with a second frame corresponding to a second position of the timeline scrollbar 504. In addition, the area covered by the first overlay grid 404 may be shaded based on the light meter information received by the GPU 130. Thus, the shading of the area covered by first overlay grid 404 may vary as shown in FIGS. 5A and 5B, in response to the changing positions of the timeline scrollbar 504.

Figure 6A:
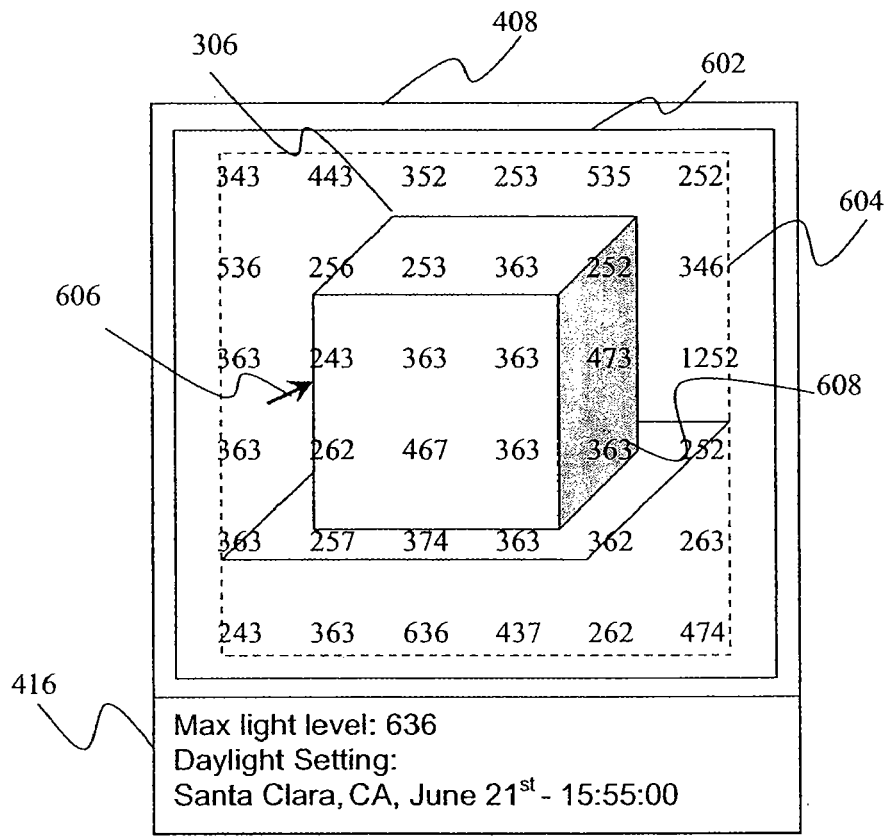
FIGS. 6A and 6B illustrate JPEG images in the second display window of FIG. 4A changing as a mouse cursor moves across the second display window 408, according to one embodiment of the present invention.
Figure 6B:
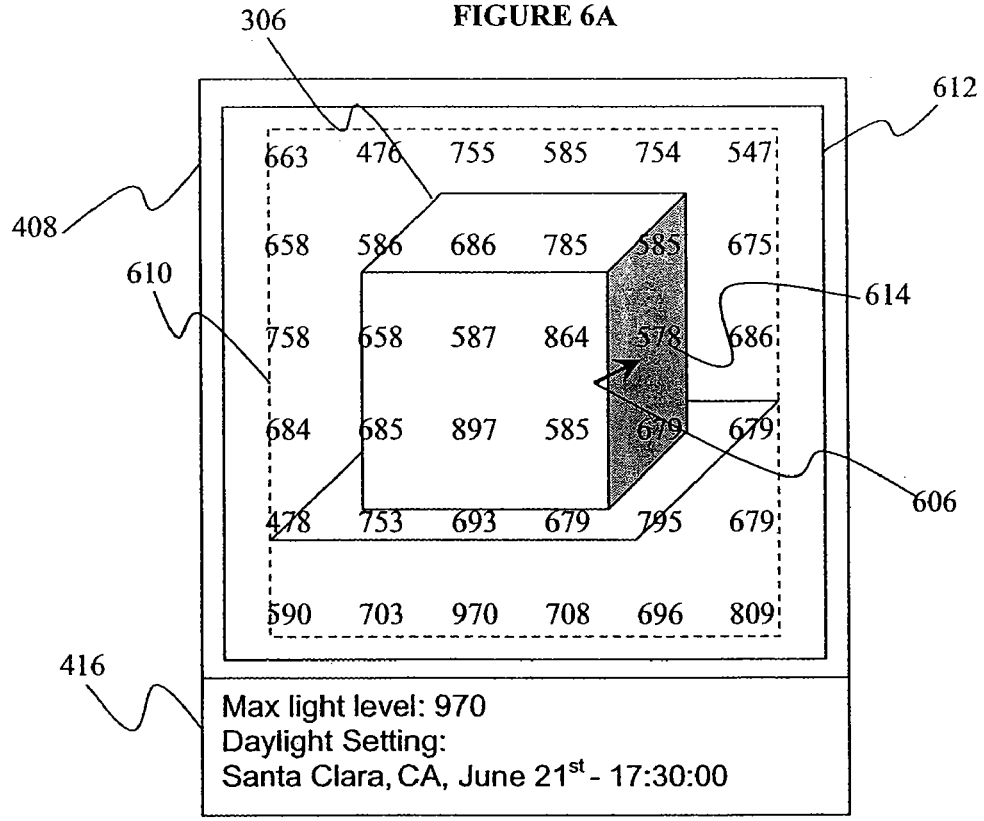

FIGS. 6A and 6B illustrate JPEG images in the second display window 408 of FIG. 4A changing as a mouse cursor 606 moves across the second display window 408, according to one embodiment of the present invention. As shown in FIG. 6A, the second display window 408 includes a JPEG image 602, a mouse cursor 606 and statistical information 416. The JPEG image 602 includes the 3-D graphics model 306 and a superimposed overlay grid 604 with per-pixel lighting values, like the value 608, that reflect the position of the light source 310 relative to 3-D graphics model 306 for a particular frame. The statistical information 416 is generated by the graphics application 104 and is specific to the JPEG image 602. The mouse cursor 606 may be moved across the second display window 408 by an end-user using the input device 112. Each position of the mouse cursor 606 is associated with a particular frame that includes the 3-D graphics model 306.

As the mouse cursor is moved, the JPEG image of the corresponding frame is transmitted by the graphics application 104 to the GPU 130, via the GPU driver 108. Again, the GPU 130 renders and scans out the resulting JPEG image for display in the second display window 408. As shown in FIG. 6B, the mouse cursor 606 is located at a different position relative to the position illustrated in FIG. 6A, and, as a result of the movement of the mouse cursor 606, the JPEG image 612 is rendered and displayed in the second display window 408. The JPEG image 612 includes the 3-D graphics model 306 and a second superimposed overlay grid 610 with the per-pixel lighting values, like value 614, that reflect the position of the light source 310 relative to the 3-D graphics model 306 for a second frame. The statistical information 416, in FIG. 6A, is associated with the JPEG image 602 and the statistical information 416, in FIG. 6B, is associated with the JPEG image 612.

Figure 7:
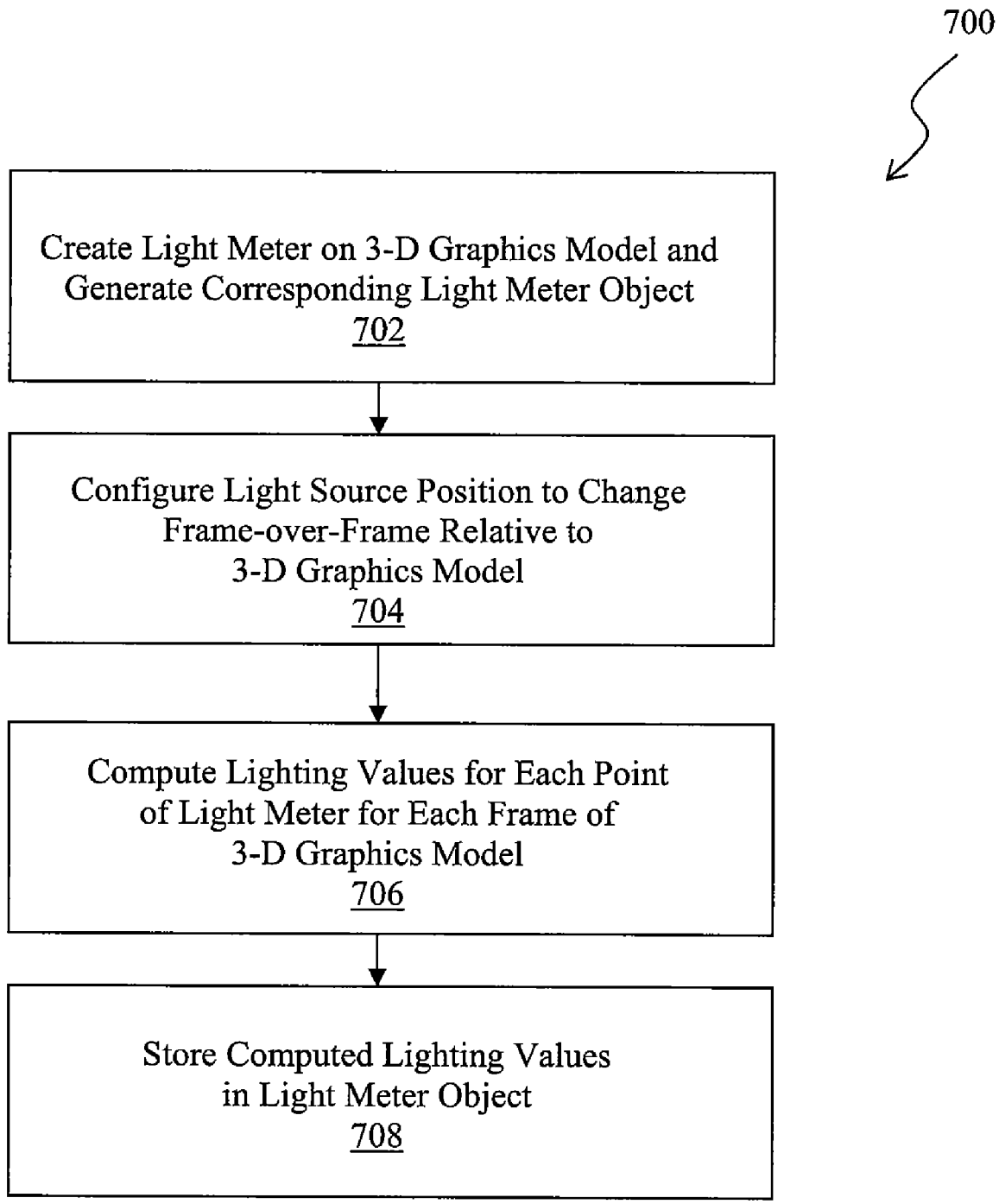
FIG. 7 is a flow diagram of method steps for calculating and storing lighting values associated with a light meter of FIG. 3 for each frame that includes the 3-D graphics model, according to one embodiment of the present invention.

FIG. 7 is a flow diagram of method steps for calculating and storing lighting values associated with the light meter 308 of FIG. 3 for each frame that includes the 3-D graphics model 306, according to one embodiment of the present invention. Although the method steps are described in conjunction with the systems for FIGS. 1-6B, persons skilled in the art will understand that any system configured to perform the method steps, in any order, is within the scope of the invention.

The method 700 begins at step 702, where a light meter 308 is created on a 3-D graphics model 306 by an end-user and a corresponding light meter object 206 is generated and stored in the graphics model buffer 202 in the graphics application 104. At step 704, the position of the light source 310 is configured to change relative to the 3-D graphics model 306 for each frame that includes the 3-D graphics model 306, by the end-user. The graphics data associated with each frame is stored in the graphics data buffer 204 in the graphics model buffer 202. At step 706, the end-user presses the calculate button 316, using the input device 112. The graphics application 104 detects this input and transmits a request to the software rendering engine 210 to compute the lighting values associated with each grid point of the light meter 308 for each frame that includes the 3-D graphics model 306. At step 708, the computed lighting values associated with the light meter 308 are transmitted by the software rendering engine 210 to the light meter object 206, where the lighting values are stored.

Figure 8:
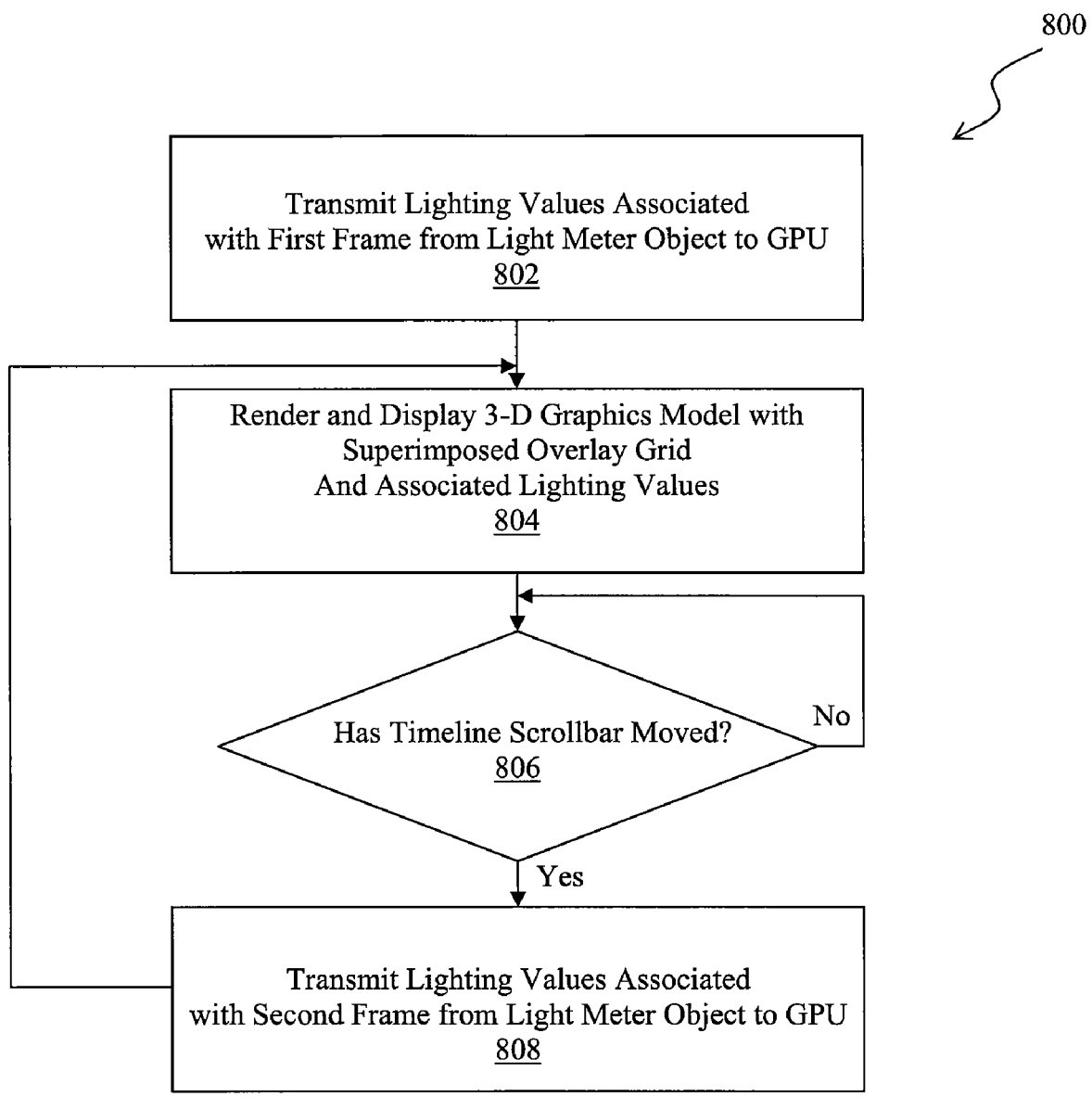
FIG. 8 is a flow diagram of method steps for displaying the lighting values associated with the light meter of FIG. 3 frame-over-frame on the first overlay grid of FIG. 4A, according to one embodiment of the present invention.

FIG. 8 is a flow diagram of method steps for displaying the lighting values associated with the light meter 308 of FIG. 3 frame-over-frame on the first overlay grid 404 of FIG. 4A, according to one embodiment of the present invention. Although the method steps are described in conjunction with the systems for FIGS. 1-6B, persons skilled in the art will understand that any system configured to perform the method steps, in any order, is within the scope of the invention.

The method 800 begins at step 802, where the graphics application 104 transmits the lighting values associated with the light meter 308 for a first frame that includes the 3-D graphics model 306 from the light meter object 206 to the GPU 130. As described in conjunction with FIG. 4A, the graphics application 104 also transmits instructions to render the superimposed first overlay grid 404 with lighting values associated with the light meter 308 on the 3-D graphics model 306 at a position defined by the location of the light meter 308 to the GPU driver 108. The GPU driver 108 transmits these instructions as well as the lighting values and light meter information to the GPU 130. At step 804, the GPU 130 renders the 3-D graphics model 306 along with the first overlay grid 404 with lighting values associated with the light meter 308 superimposed on the 3-D graphics model 306 and scans out the resulting image for display within the first display window 402.

At step 806, if the timeline scrollbar 504 is moved by the end-user, using the input device 112, then the graphics application 104 detects this movement, and the method 800 proceeds to step 808. At step 808, the graphics application 104 transmits, from the light meter object 206 to the GPU 130, the lighting values associated with the light meter 308 for a second frame that includes the 3-D graphics model 306. The method 800 then returns to step 804. The method 800 continues in this fashion, looping through step 804-808, to display lighting values associated with the light meter 308 for various frames that include the 3-D graphics model 306.

If, however at step 806, the timeline scrollbar 504 is not moved by the end-user, then the method 800 continues to loop back to step 806 until the timeline scrollbar 504 is moved.

Figure 9:
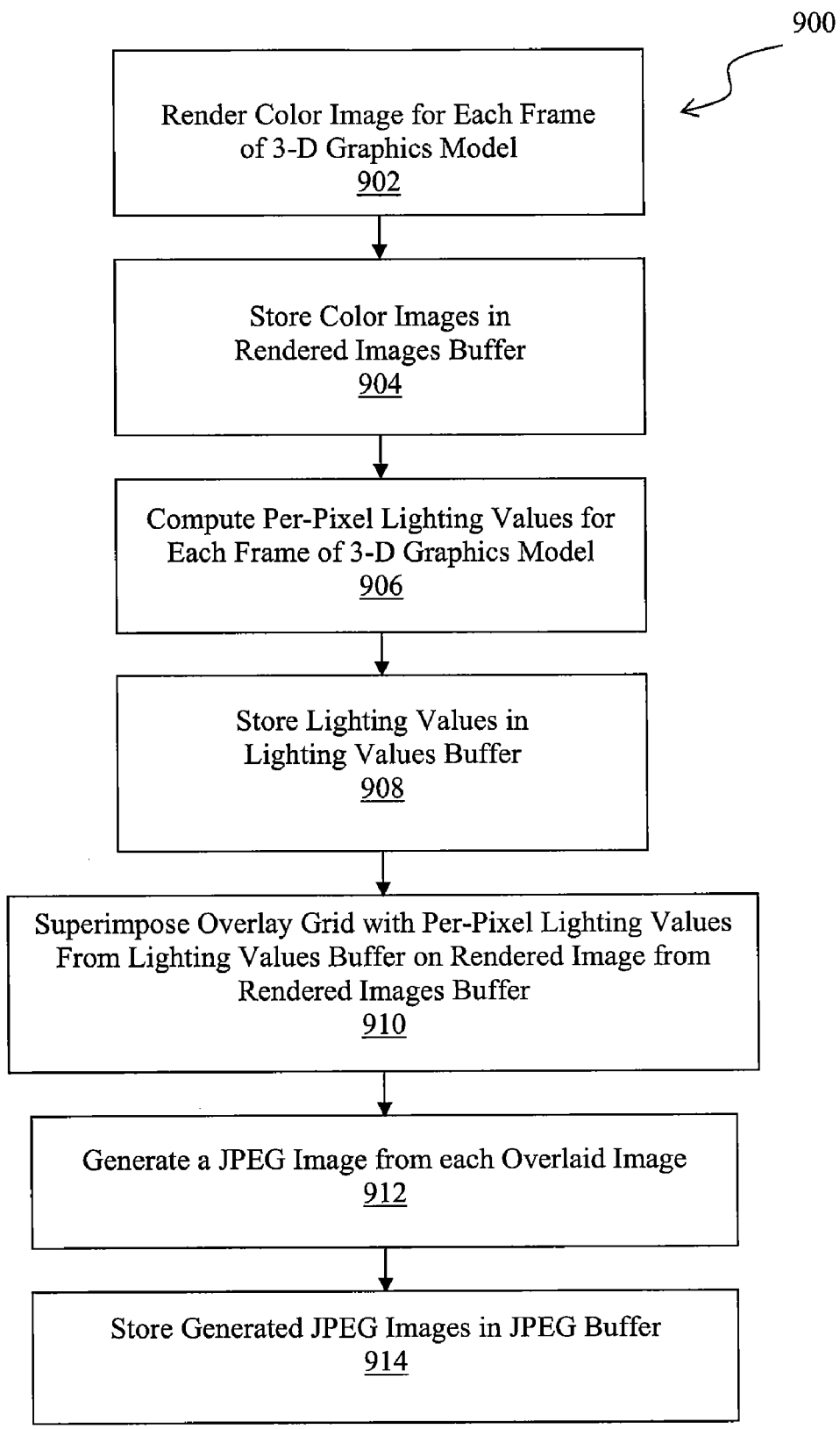
FIG. 9 is a flow diagram of method steps for generating a JPEG image with a superimposed overlay grid with lighting values for each frame that includes the 3-D graphics model, according to one embodiment of the present invention.

FIG. 9 is a flow diagram of method steps for generating a JPEG image with a superimposed overlay grid with lighting values for each frame that includes the 3-D graphics model 306, according to one embodiment of the present invention. Although the method steps are described in conjunction with the systems for FIGS. 1-6B, persons skilled in the art will understand that any system configured to perform the method steps, in any order, is within the scope of the invention.

The method 900 begins at step 902, where the software rendering engine 210 renders a color image for each frame that includes the 3-D graphics model 306. As described in conjunction with FIG. 2, the software rendering engine 210 uses the graphics data in the graphics data 204 to render the high-quality color images. At step 904, the rendered images are stored in the rendered images buffer 214, via the communication path 212. At step 906, the software rendering engine 210 computes the per-pixel lighting values for each frame that includes the 3-D graphics model 306. At step 908, the computed per-pixel lighting values are stored in the lighting values buffer 218.

At step 910, the software rendering engine 210 retrieves the rendered images from the rendered images buffer 214 and the lighting values from lighting values buffer 218 and superimposes an overlay grid with per-pixel lighting values associated with each frame that includes the 3-D graphics model 306 on the corresponding rendered image. At step 912, the software rendering engine 210 generates a JPEG image from each of the rendered images with the superimposed overlay grid with per-pixel lighting values. At step 914, the generated JPEG images are stored in the JPEG buffer 222. The graphics application 104 may also transmit the JPEG images from the JPEG buffer 222 to the application memory 118 portion of the external memory 116, via the CPU 122, for storage.

Figure 10:
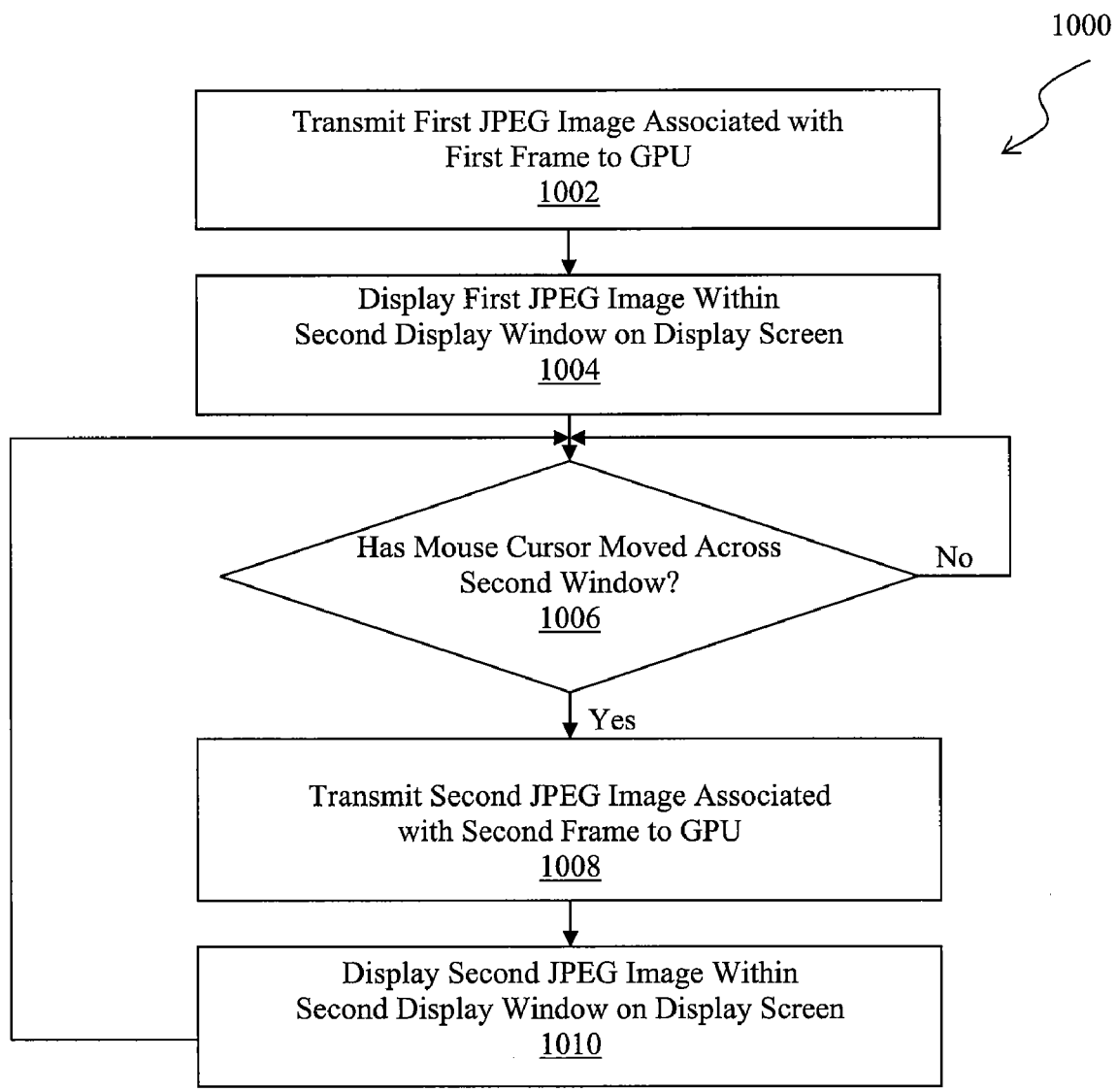
FIG. 10 is a flow diagram of method steps for displaying JPEG images frame-over-frame in the second display window of FIG. 4A, according to one embodiment of the present invention.

FIG. 10 is a flow diagram of method steps for displaying JPEG images frame-over-frame in the second display window 408 of FIG. 4A, according to one embodiment of the present invention. Although the method steps are described in conjunction with the systems for FIGS. 1-6B, persons skilled in the art will understand that any system configured to perform the method steps, in any order, is within the scope of the invention.

The method 1000 begins at step 1002, where the graphics application 104 transmits a first JPEG image associated with a first frame that includes the 3-D graphics model 306 to the GPU 130, via the GPU driver 108. The graphics application 104 may retrieve the JPEG image from the JPEG buffer 222 or the application memory 118 portion of the external memory 116. At step 1004, the first JPEG image received by the GPU 130 is rendered and scanned out for display in the second display window 408.

At step 1006, if the mouse cursor 606 is moved across the second display window 408 by an end-user, then the graphics application 104 detects this movement and the method 1000 proceeds to step 1008. At step 1008, the graphics application 104 transmits a second JPEG image associated with a second frame that includes the 3-D graphics model 306 to the GPU 130, via the GPU driver 108. At step 1010, the second JPEG image received by the GPU 130 is rendered and scanned out for display in the second display window 408, and the method 1000 returns to step 1006. The method 1000 continues in this fashion, looping through steps 1006-1010 to display different JPEG images which include overlay grids with per-pixel lighting values that are associated with various frames that include the 3-D graphics model 306. If, at step 1006, the mouse cursor 606 is not moved by the end-user, then the method 1000 continues to loop back to step 1006, until the mouse cursor 606 is moved.

In sum, displaying lighting values associated with object surfaces in a 3-D graphics model may be accomplished with an overlay grid that is superimposed on the 3-D graphics model and shows lighting values associated with one or more object surfaces in the 3-D graphics model. More specifically, a light meter object is created and used to define a light meter, which is an area on a surface within the 3-D graphics model for which lighting values are computed. Lighting values associated with the light meter are computed by the software rendering engine for grid points within the light meter for each frame that includes the 3-D graphics model. The lighting values associated with the light meter are stored in the light meter object in the graphics application in the system memory. For each frame that includes the 3-D graphics model, the lighting values and the shading information of the light meter associated with that frame are transmitted from the light meter object within the graphics application to the GPU via a GPU driver. The GPU superimposes the received lighting values associated with the light meter on points on an overlay grid on the 3-D graphics model and displays the overlay grid with the light meter lighting values on a display window within the display screen. Further, the area defined by the light meter on the 3-D graphics model is shaded according to the graphics data received by the GPU. As an end-user moves a timeline scrollbar on the display screen, lighting values associated with a corresponding frame are superimposed on the overlay grid on the 3-D graphics model and the shading of the area covered by the overlay grid on the 3-D graphics model varies accordingly.

In addition, the software rendering engine renders a high-quality colored image and computes per-pixel lighting values for each frame that includes the 3-D graphics model. For each frame, an overlay grid with a per-pixel lighting value associated with each point on the overlay grid is superimposed on the high-quality colored image of the 3-D graphics model associated with that frame. The software rendering engine then renders a JPEG image from each of the high-quality colored images with the superimposed overlay grid. The generated JPEG image includes the 3-D graphics model with the superimposed overlay grid with the per-pixel lighting values and may be stored in the application memory portion of the external memory. In one embodiment, the per-pixel lighting values in the generated JPEG images are color-coded, using hot/cold pseudo-coloring techniques, to indicate the light intensities associated with the different points on the overlay grid for which lighting values are provided. A generated JPEG image associated with a particular frame may be transmitted by the graphics application to the GPU which renders the JPEG image and scans out the resulting image for display in a dedicated display window within the display screen. As an end-user scrolls over the dedicated display window with a mouse cursor, the JPEG images are transmitted sequentially by the application memory to the GPU via the GPU driver. The GPU displays the JPEG image within the dedicated display window to show the varying lighting values as the mouse cursor is moved.

Advantageously, superimposing an overlay grid with lighting values on a 3-D graphics model allows the end-user to easily view the lighting values associated with the 3-D graphics model. In addition, since the lighting values associated with a light meter and the per-pixel lighting values are computed for every frame that includes the 3-D graphics model, the effects of a varying light source on the 3-D graphics model can be easily observed by way of the overlay grid with computed lighting values rendered on top of the 3-D graphics model within a first display window or a JPEG image displayed within a second display window that includes an overlay grid with per-pixel lighting values superimposed on the 3-D model. The shading of the area covered by the overlay grid with lighting values rendered on top of the 3-D graphics model within the first display window as well as the color coding of the per-pixel lighting values displayed in the second display window provide a high-level view of the computed lighting values to the end-user.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for displaying lighting values associated with a graphics model, the method comprising:
   generating a light meter on a surface associated with the graphics model, wherein the graphics model includes one or more graphics objects, and the light meter defines a set of points on the surface associated with the graphics model;
   generating a light meter object corresponding to the light meter;
   computing a lighting value for each point in the set of points based on at least one light source associated with the graphics model to generate a first set of computed lighting values;
   storing the first set of computed lighting values in the light meter object;
   rendering the graphics model, an overlay grid, and the first set of computed lighting values transmitted from the light meter object for display in a first display window, wherein the overlay grid and the first set of computed lighting values are superimposed on the graphics model, and each grid point in the overlay grid corresponds to a computed lighting value stored in the light meter object;
   rendering the graphics model to generate a high-quality colored image of the graphics model;
   computing lighting values for every pixel of the high-quality colored image based on the at least one light source to generate a second set of computed lighting values;
   superimposing a second overlay grid on the high-quality colored image to generate a display image, wherein the second overlay grid comprises a least a subset of the second set of computed lighting values, and wherein an area in the display image covered by the second overlay grid is shaded based on the second set of computed lighting values; and
   converting the display image to a JPEG-formatted image for display in a second display window.

2. The method of claim 1, further comprising the step of transmitting the first set of computed lighting values from the light meter object to a graphics processing unit.

3. The method of claim 1, further comprising the step of displaying the graphics model, overlay grid, and the first set of computed lighting values in the first display window.

4. The method of claim 1, wherein the at least one light source is configured to change position relative to the graphics model.

5. The method of claim 4, wherein the first set of computed lighting values is based on a first position of the at least one light source, and further comprising the steps of:
   computing a lighting value for each point in the set of points based on a second position of the at least one light source to generate a third set of computed lighting values;
   storing the third set of computed lighting values in the light meter object;
   rendering the graphics model to generate a second high-quality colored image of the graphics model based on the second position of the at least one light source;
   computing lighting values for every pixel of the second high-quality colored image based on the second position of the at least one light source to generate a fourth set of computed lighting values;
   superimposing a third overlay grid on the second high-quality colored image to generate a second display image, wherein the third overlay grid comprises a least a subset of the fourth set of computed lighting values, and wherein an area in the second display image covered by the third overlay grid is shaded based on the fourth set of computed lighting values; and
   converting the second display image to a second JPEG-formatted image for display in the second display window.

6. The method of claim 5, further comprising the step of transmitting the third set of computed lighting values from the light meter object to the graphics processing unit.

7. The method of claim 6, further comprising the step of rendering the graphics model, the overlay grid and the third set of computed lighting values transmitted from the light meter object, wherein the overlay grid and the third set of computed lighting values are superimposed on the graphics model.

8. The method of claim 7, further comprising the step of displaying the graphics model, the overlay grid, and either the first set of computed lighting values or the third set of computed lighting values in the first display window based on a position of a timeline scrollbar associated with the first display window.

9. A non-transitory computer-readable medium including instructions that, when executed by a processing unit, cause the processing unit to display lighting values associated with a graphics model, by performing the steps of:
   generating a light meter on a surface associated with the graphics model, wherein the graphics model includes one or more graphics objects, and the light meter defines a set of points on the surface associated with the graphics model;
   generating a light meter object corresponding to the light meter;
   computing a lighting value for each point in the set of points based on at least one light source associated with the graphics model to generate a first set of computed lighting values;
   storing the first set of computed lighting values in the light meter object;
   rendering the graphics model, an overlay grid, and the first set of computed lighting values transmitted from the light meter object for display in a first display window, wherein the overlay grid and the first set of computed lighting values are superimposed on the graphics model, and each grid point in the overlay grid corresponds to a computed lighting value stored in the light meter object;
   rendering the graphics model to generate a high-quality colored image of the graphics model;

computing lighting values for every pixel of the high-quality colored image based on the at least one light source to generate a second set of computed lighting values;

superimposing a second overlay grid on the high-quality colored image to generate a display image, wherein the second overlay grid comprises a least a subset of the second set of computed lighting values, and wherein an area in the display image covered by the second overlay grid is shaded based on the second set of computed lighting values; and converting the display image to a JPEG-formatted image for display in a second display window.

10. The computer-readable medium of claim 9, further comprising the step of transmitting the first set of computed lighting values from the light meter object to a graphics processing unit.

11. The computer-readable medium of claim 9, wherein the at least one light source is configured to change position relative to the graphics model.

12. The computer-readable medium of claim 11, wherein the first set of computed lighting values is based on a first position of the at least one light source, and further comprising the steps of:

computing a lighting value for each point in the set of points based on a second position of the at least one light source to generate a third set of computed lighting values;

storing the third set of computed lighting values in the light meter object;

rendering the graphics model to generate a second high-quality colored image of the graphics model based on the second position of the at least one light source;

computing lighting values for every pixel of the second high-quality colored image based on the second position of the at least one light source to generate a fourth set of computed lighting values;

superimposing a third overlay grid on the second high-quality colored image to generate a second display image, wherein the third overlay grid comprises a least a subset of the fourth set of computed lighting values, and wherein an area in the second display image covered by the third overlay grid is shaded based on the fourth set of computed lighting values; and converting the second display image to a second JPEG-formatted image for display in the second display window.

13. The computer-readable medium of claim 12, further comprising the step of determining that a timeline scrollbar associated with the first display window, in which the graphics model, the overlay grid and computed lighting values are displayed, has moved.

14. The computer-readable medium of claim 13, in response to determining that the timeline scrollbar has moved, further comprising the step of transmitting the third set of computed lighting values from the light meter object to the graphics processing unit, wherein the graphics model, the overlay grid and the third set of computed lighting values are subsequently rendered with the overlay grid and the third set of computed lighting values superimposed on the graphics model.

15. A computing system configured to display lighting values associated with a graphics model, the computing system comprising:

a processing unit; and a system memory coupled to the processing unit and including a graphics application configured to:

generate a light meter on a surface associated with the graphics model, wherein the graphics model includes one or more graphics objects, and the light meter defines a set of points on the surface associated with the graphics model, generate a light meter object corresponding to the light meter, compute a lighting value for each point in the set of points based on at least one light source associated with the graphics model to generate a first set of computed lighting values, store the first set of computed lighting values in the light meter object, render the graphics model, an overlay grid, and the first set of computed lighting values transmitted from the light meter object for display in a first display window, wherein the overlay grid and the first set of computed lighting values are superimposed on the graphics model, and each grid point in the overlay grid corresponds to a computed lighting value stored in the light meter object, render the graphics model to generate a high-quality colored image of the graphics model, compute lighting values for every pixel of the high-quality colored image based on the at least one light source to generate a second set of computed lighting values, superimpose a second overlay grid on the high-quality colored image to generate a display image, wherein the second overlay grid comprises a least a subset of the second set of computed lighting values, and wherein an area in the display image covered by the second overlay grid is shaded based on the second set of computed lighting values, and convert the display image to a JPEG-formatted image for display in a second display window.

16. The computer system of claim 15, wherein:

the graphics application is further configured to transmit the first set of computed lighting values and the JPEG-formatted image to the processing unit; and the processing unit is configured to:

display in the first display window the graphics model, the overlay grid, and the first set of computed lighting values, and display in the second display window the JPEG-formatted image.

17. The computer system of claim 16, wherein the first set of computed lighting values is based on a first position of the at least one light source, and:

the graphics application is further configured to:

compute a lighting value for each point in the set of points based on a second position of the at least one light source to generate a third set of computed lighting values, store the third set of computed lighting values in the light meter object, render the graphics model to generate a second high-quality colored image of the graphics model based on the second position of the at least one light source, compute lighting values for every pixel of the second high-quality colored image based on the second position of the at least one light source to generate a fourth set of computed lighting values, superimpose a third overlay grid on the second high-quality colored image to generate a second display image, wherein the third overlay grid comprises a least a subset of the fourth set of computed lighting values, and wherein an area in the second display image covered by the third overlay grid is shaded based on the fourth set of computed lighting values, convert the second display image to a second JPEG-formatted image for display in the second display window determine that a timeline scrollbar associated with the display window has moved, and in response, transmit the third set of computed lighting values and the second JPEG-formatted image to the processing unit; and the processing unit is further configured to:

render the graphics model, the overlay grid and the third set of computed lighting values, with the overlay grid and the third set of computed lighting values superimposed on the graphics model, display in the first display window the graphics model, the overlay grid and the third set of computed lighting values, and display in the second display window the second JPEG-formatted image.

* * * * *